United States Patent [19]
Reichek et al.

[11] Patent Number: 5,960,448
[45] Date of Patent: *Sep. 28, 1999

[54] SYSTEM AND METHOD FOR DISPLAYING A GRAPHICALLY ENHANCED VIEW OF A REGION OF A DOCUMENT IMAGE IN WHICH THE ENHANCED VIEW IS CORRELATED WITH TEXT DERIVED FROM THE DOCUMENT IMAGE

[75] Inventors: Joshua A. S. Reichek, Berkeley; Avi J. Stackenfeld, Richmond; David B. McMurray, San Francisco, all of Calif.

[73] Assignee: Legal Video Services Inc., Oakland, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,523

[22] Filed: Dec. 15, 1995

[51] Int. Cl.$^6$ .................................................. G06F 17/00
[52] U.S. Cl. ............................................ 707/526; 707/512
[58] Field of Search ..................................... 395/788–791, 395/615; 345/433, 435, 439; 707/526–529, 512

[56] References Cited

U.S. PATENT DOCUMENTS

| | | | |
|---|---|---|---|
| 4,985,863 | 1/1991 | Fujisawa et al. | 395/603 |
| 4,994,987 | 2/1991 | Baldwin | 434/305 |

(List continued on next page.)

OTHER PUBLICATIONS

S. Davis, "Litigation Support, Digging the Documents", California Lawyer, Nov. 1995, pp. 54–56.
inVzn Marketing Brochure: Product Information WinVzn, (2 pages), No Date.
inVzn Marketing Brochure: Trial–Link Hardware, (3 pages), No Date.
inVzn Marketing Brochure: Intercept, (4 pages), No Date.
inVzn Marketing Brochure: WinVzn Scan, (2 pages), No Date.
inVzn Marketing Brochure: WinVzn DOS, (2 pages), No Date.
inVzn Marketing Brochure: Trial–Link FMV & Trial–Link Express, (4 pages), No Date.
inVzn Marketing Brochure: WinVzn, (2 pages), No Date.
inVzn Marketing Brochure: O.J. Simpson Defense Team Selects inVzn Technology for Evidence Presentation, Aug. 22, 1994.
T. O'Connor, "Document Imaging Management", Law Office Computing, vol. 4, Issue 1. (2 pages), Feb./Mar. 1994.

(List continued on next page.)

*Primary Examiner*—Joseph R. Burwell
*Attorney, Agent, or Firm*—Wilson Sonsini Goodrich & Rosati

[57] ABSTRACT

A method of displaying information in a computer system is described. The computer system includes a plurality of document images, a plurality of text files, and a plurality of positions files. A first text file of the plurality of text files represents optical character recognized text of a corresponding first document image of the plurality of document images. A first positions file of the plurality of positions files relates character information in the first text file to a position in the first document image. The computer system searches the plurality of text files using a search term to generate a set of found text files. Each found text file of the set of found text files includes at least a first matching text string to the search term; the set of found text files includes the first text file. The system accesses the first positions file to determine a first region in the first document image corresponding to the first matching text string. The system displays the first document image including displaying a first enhanced view of the first region, the first enhanced view being enhanced relative to a display of the first document image, the first enhanced view being determined from a previously stored visual enhancement definition.

27 Claims, 16 Drawing Sheets

U.S. PATENT DOCUMENTS

| | | | |
|---|---|---|---|
| 5,029,112 | 7/1991 | Sakamoto et al. | 395/118 |
| 5,047,868 | 9/1991 | Takeda et al. | 386/109 |
| 5,161,214 | 11/1992 | Addink et al. | 395/601 |
| 5,165,103 | 11/1992 | Takeda et al. | 382/305 |
| 5,341,466 | 8/1994 | Perlin et al. | 395/139 |
| 5,392,428 | 2/1995 | Robins | 395/603 |
| 5,444,615 | 8/1995 | Bennett et al. | 395/208 |
| 5,467,441 | 11/1995 | Stone et al. | 395/133 |
| 5,473,744 | 12/1995 | Allen et al. | 345/302 |
| 5,495,581 | 2/1996 | Tsai | 395/788 |
| 5,504,853 | 4/1996 | Schuur et al. | 395/356 |
| 5,517,605 | 5/1996 | Wolf | 395/615 |
| 5,586,196 | 12/1996 | Sussman | 382/114 |
| 5,596,690 | 1/1997 | Stone et al. | 395/133 |
| 5,619,594 | 4/1997 | Melen | 382/233 |
| 5,623,681 | 4/1997 | Rivette et al. | 395/788 |

OTHER PUBLICATIONS

M. Bauman, "Exxon Jurors Won't Chase Paper in Trial", The Alaska Journal of Commerce, Apr. 18, 1994, vol. 18, No. 16.

"ScanWorX API", Xerox Imaging Systems, P.N. 00–07805–00, Mar. 31, 1994.

SYSTEM AND METHOD FOR DISPLAYING A GRAPHICALLY ENHANCED VIEW OF A REGION OF A DOCUMENT IMAGE IN WHICH THE ENHANCED VIEW IS CORRELATED WITH TEXT DERIVED FROM THE DOCUMENT IMAGE

BACKGROUND OF THE INVENTION

1. Field of Invention

The invention relates to the field of information retrieval and display. In particular, the invention describes an integrated image and text storage, retrieval, and display system.

2. Description of the Related Art

Attorneys, bankers, insurance industry personnel, and other people, often work with large amounts of information in printed form. These people depend upon the persuasive presentation of information. That is, being able to organize and present information effectively and efficiently is paramount. Some systems, such as PowerPoint® from Microsoft, Inc., or Photoshop® from Adobe Systems, Inc., help users present information. Other systems, such as systems from Oracle Systems, Inc., help users find and retrieve information. However, these systems have a number of drawbacks.

The difference between a layman and an expert in presentation graphics is not in creating one graphical display, it is in the skill of transitioning well between graphic displays. That is, to tell a story. What is missing from the above systems is the combination of the organizational tools with the presentation tools to make developing a presentation easier, faster, and less expensive.

In a system, by the name of MarcoPolo 3.0, available from Mainstay of Camarillo, Calif., scanned paper documents are turned into electronic image files that are then processed using an optical character recognition program. Each scanned image is processed by the optical character recognition program and a corresponding electronic text file is generated. If a particular word or character cannot be recognized, then the text file will include the actual pixels from the original document. However, this leads to a number of problems. First, the full text of the document cannot be searched because some words will not appear in the text file. Second, the display of a retrieved file is not processed to make the generation of a persuasive presentation simpler.

Win Vzn Development Corporation, of Gilbert, Ariz., sells the WinVzn™ system. In WinVzn, images can be scanned and retrieved. Management tools allow a user to access, view and print scanned documents. Image control tools allow a user to view images by zooming, rotating and reversing the image. However, this system has a number of drawbacks. First, there is no link between the text contained in the image and the actual images, thus, searches cannot be performed on the text of the images. Second, automated visual enhancements are not generated from the search results.

Therefore, what is needed is a document handling, image processing, and image retrieval system that allows a person to perform text searches on the optically scanned, optically character recognized, original documents. The system should automatically generate enhanced visual graphics to be displayed with the original document images. Tools should be included that make the creation of a presentation easier, faster, and less expensive.

SUMMARY OF THE INVENTION

An improved apparatus and method for accessing and presenting information is described.

A method of displaying information in a computer system. The computer system including a plurality of document images, a plurality of text files, and a plurality of positions files. A first text file of the plurality of text files representing optical character recognized text of a corresponding first document image of the plurality of document images. A first positions file of the plurality of positions files for relating character information in the first text file to a position in the first document image. The method comprising the following steps. The computer system searches the plurality of text files using a search term to generate a set of found text files. Each found text file of the set of found text files includes at least a first matching text string to the search term; the set of found text files includes the first text file. Accessing the first positions file to determine a first region in the first document image corresponding to the first matching text string. Displaying the first document image including displaying a first enhanced view of the first region, the first enhanced view being enhanced relative to a display of the first document image.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW OF ONE EMBODIMENT OF THE PRESENT INVENTION

Figure 1:
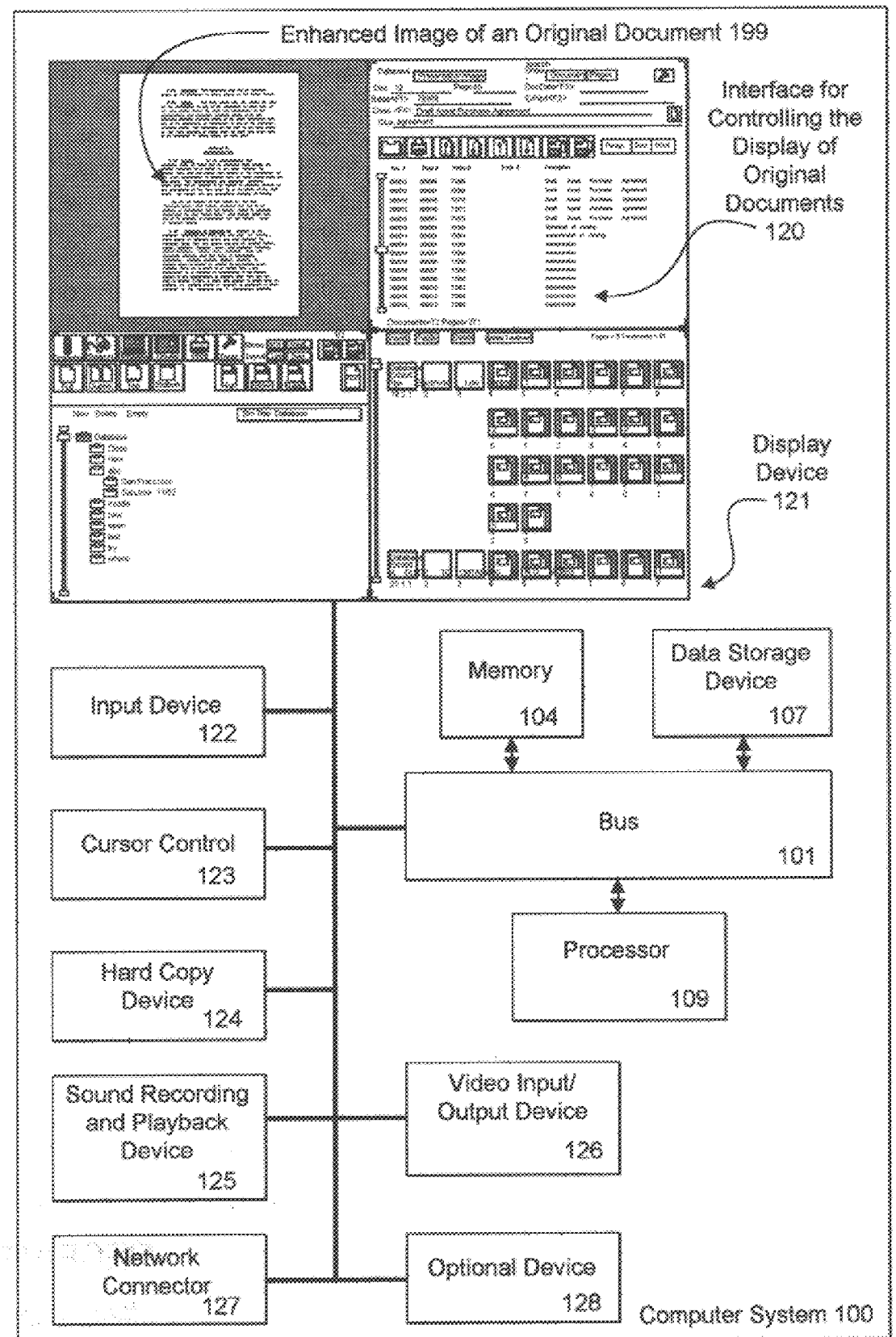
FIG. 1 illustrates a computer system including one embodiment of the invention.

An improved apparatus and method for accessing and presenting information is described. In one embodiment, a user can efficiently create a persuasive and effective presentation of original document information. Given a new presentation topic, the user has the system search the text contained in images of original documents, and/or fields automatically generated from those documents, to find images of documents relating to that topic. The display of the images is parameterized to automatically define regions of interest based upon, for example, paragraphs, sentences or words. Thus, the system correlates a full text equivalent of a document to the spatial locations of the text on the document image.

The user then has the system automatically treat the set of found images and regions with high resolution visual graphics to enhance the display of those images. The treatments are stored in a storage area, allowing the user to select, order and further enhance the display of the images for a presentation.

The system can automatically create a presentation book (e.g. a trial notebook). Each notebook page contains a document image with bar-codes corresponding to treatments for that document image. When the user scans a bar-code with a bar-code reading device, the system accesses the particular document image and displays it with the corresponding treatment.

In one embodiment, an image storage and retrieval system allows a user to scan an original image to create an image file. Optical character recognition is performed on the image file to produce a text file and a positions file. The positions file spatially relates the characters in the text file to their positions in the image file. The text file is entered into a full text database. Additionally, fields information, such as the document date, is automatically extracted from the document.

Using a search term, a user can then perform a full text and/or field based search. A number of image files may be found that correspond to the search term. The search term can be a compilation of search terms including other search terms. The search terms can be text strings, and/or one or more fields, and/or value ranges, etc. The system automatically creates regions of interest that define areas in the image files that correspond to the search term. Visual enhancements, or treatments, are then automatically created for these image files and regions of interest. The treatments can include highlighting a region of interest, displaying a blow-up of that region of interest, displaying text from the corresponding text file or some other visual effect. The treatments are stored in a storage area, such as a bin. The user can then select which combinations of image files, regions of interest, and treatments to include in a presentation.

Importantly, a unique identification system correlates the image files, text files, treatments and regions of interest. A specific image file, and corresponding text file, are identified by their document id (for example, a document number or an alphanumeric, a general descriptor or some other document identifier) and page id (for example, a page number, an alphanumeric, a descriptor or some other page identifier). A visual enhancement is identified by its document id, page id, general visual enhancement id (script id), region of interest id, and specific visual enhancement id. Thus, instead of having to store the relatively large enhanced visual images, the system can access a specific image, script, region of interest, and treatment and, on the fly, generate the corresponding enhanced visual image.

For a presentation, the user has the system print the corresponding document images as presentation notebook pages. Each printed image includes bar-codes corresponding to different visual enhancements for that document image. A bar-code includes the document id, page id, script id, region of interest id, and specific visual enhancement id. The user uses a wireless bar-code reader to scan a bar-code into the system. The system accesses the specific image, script, region of interest, and treatment and, on the fly, generates the visually enhanced document image that corresponds to that bar-code. Thus, using the presentation notebook pages (e.g. trial notebook pages), a user can have the system quickly and simply access and display a particular enhanced image.

A COMPUTER SYSTEM

FIG. 1 illustrates a computer system 100 upon which an embodiment of the invention can be implemented. In one embodiment, computer system 100 includes a workstation from Sun Microsystems, Inc. of Mountain View, Calif. In another embodiment, computer system 100 includes a personal computer such as an IBM compatible, or a Macintosh® from Apple Computer Inc.

The computer system 100 includes a bus 101, or other communications hardware and software, for communicating information, and a processor 109, coupled with the bus 101, for processing information. The processor 109 can be a single processor or a number of individual processors that can work together. The computer system 100 further includes a memory 104. The memory 104 can include a random access memory (RAM), or some other storage devices. The memory 104 is coupled to the bus 101 and is for storing information and instructions to be executed by the processor 109.

The computer system 100 can optionally include a data storage device 107, such as a magnetic disk, a digital tape system, or an optical disk and a corresponding disk drive. The data storage device 107 can be coupled to the bus 101.

The computer system 100 can also include one, or more, display devices 121 for displaying information to the user. The display device 121 can be coupled to the bus 101. The display device 121 can include a frame buffer, specialized graphics rendering devices, a cathode ray tube (CRT), and/or a flat panel display. Alternatively, the display device 121 can include an overhead, that would display the information in preview window 330 (shown in FIG. 3). The bus 101 can include a separate bus for use by the display device 121 alone. Display device 121 can display the interface for controlling the display of original documents 120. The display device 121 can display an enhanced image of an original document 199.

An input device 122, optionally including alphanumeric and other keys, is typically coupled to the bus 101 for communicating information, such as command selections, to the computer system. Input device 122 can include other input devices such as a bar-code reader (possibly wireless) or a scanner. Another type of user input device is a cursor control 123, such as a mouse, a trackball, a pen, a touch screen, a touch pad, a digital tablet, or cursor direction keys, for communicating direction information to the processor 109, and for controlling the cursor's movement on the display device 121. The cursor control 123 typically has two degrees of freedom, a first axis (e.g., x) and a second axis (e.g., y), which allows the cursor control 123 to specify positions in a plane. However, the computer system 100 is not limited to input devices with only two degrees of freedom.

Another device which may be optionally coupled to the bus 101 is a hard copy device 124 which may be used for printing instructions, data, or other information, on a medium such as paper, film, slides, or other types of media. The hard copy device 124 can include a printer.

A sound recording and/or playback device 125 can optionally be coupled to the bus 101. For example, the sound recording and/or playback device 125 can include an audio digitizer coupled to a microphone for recording sounds. Further, the sound recording and/or playback device 125 may include speakers which are coupled to digital to analog (D/A) converter and an amplifier for playing back sounds.

A video input/output device 126 can optionally be coupled to the bus 101. The video input/output device 126 can be used to digitize video images from, for example, a television signal, a video cassette recorder, and/or a video camera. The video input/output device 126 can include a scanner for scanning printed images. The video input/output device 126 can generate a video signal for, for example, display by a television. The video input/output device 126 can generate a video signal to be captured by a video disk, laser/optical disk, hard drives, optical drives, holographic storage devices, or videotape machines, for use in a presentation on a video screen.

Also, the computer system 100 can be part of a computer network (for example, a LAN or WAN) using an optional network connector 127, being coupled to the bus 101. In one embodiment of the invention, an entire network can then also be considered to be part of the computer system 100.

An optional device 128 can be coupled to the bus 101. The optional device 128 can include, for example, a PCMCIA (PC) card and a PCMCIA adapter. The optional device 128 can further include an optional device such as modem or a wireless network connection.

SYSTEM COMPONENTS

Figure 2:
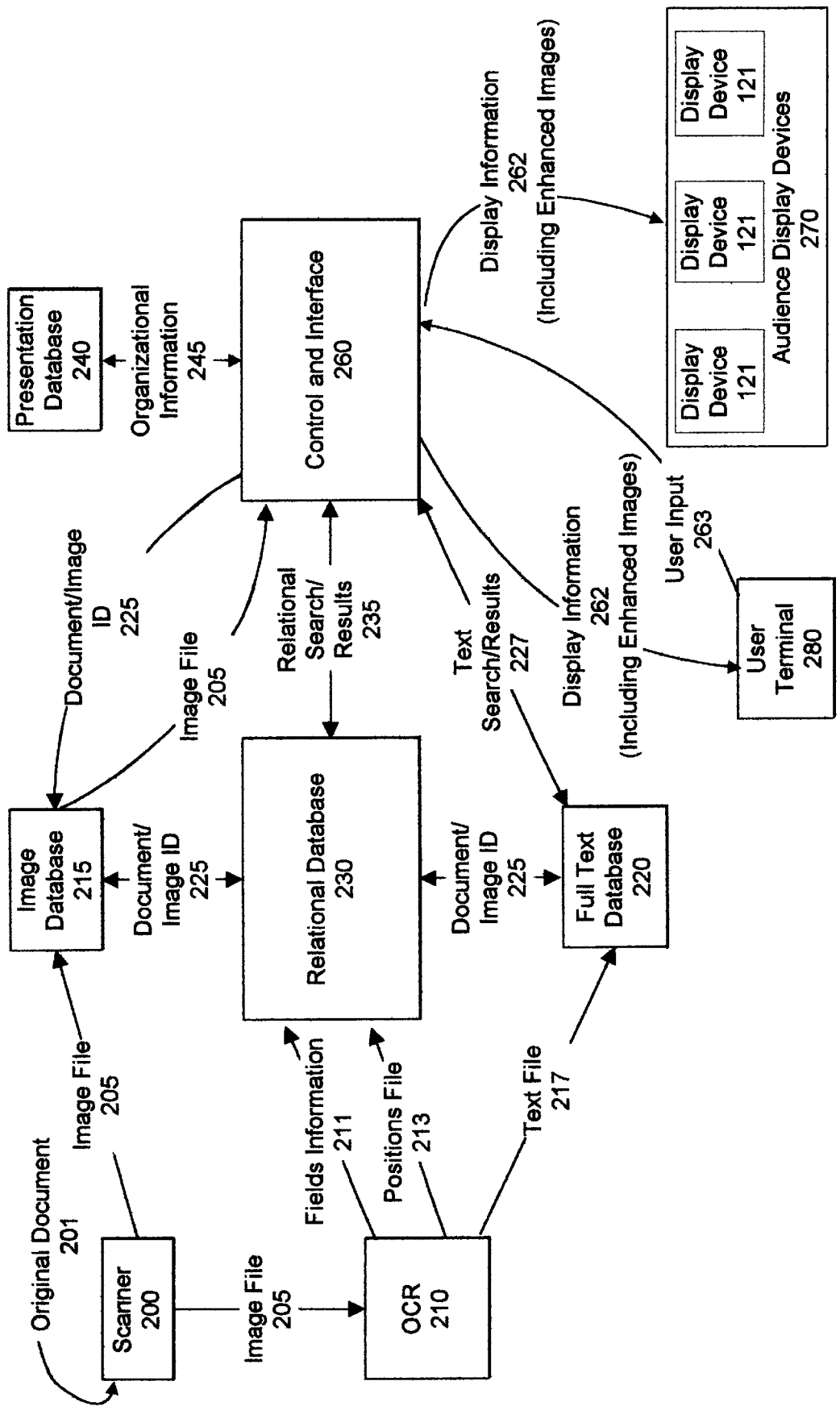
FIG. 2 illustrates system components that can be used to implement one embodiment of the invention.

Computer system 100 can execute a number of programs and communicate with a number of system components. FIG. 2 illustrates a set of programs and systems components that can be used in one embodiment of the invention. Original documents can be scanned, processed, searched, and displayed using the programs and system components of FIG. 2.

The original document 201 is scanned in the scanner 200. The scanner 200 typically includes software to receive data from the input device 122 and create an image file 205. In one embodiment, the image file 205 includes a photo-realistic image of the original document 201.

In one embodiment, the original document 201 is scanned at 300 dpi. In another embodiment, other scan resolutions are used. For example, a scan resolution of 200 dpi is acceptable, however, optical character recognition is not as effective at this scan resolution. Alternatively, 600 dpi can be used, however, the image file 205 is quite large. The scanner 200 may be optional where, for example, the "original document" is in electronic form, such as document from a CD-ROM, or a fax received by a computer.

The image file 205 is communicated from the scanner 200 to the OCR 210 and the image database 215. The OCR 210 typically includes an optical character recognition program and some fields information extraction routines. The optical character recognition program in one embodiment is Scanworks from Xerox Corporation. In another embodiment, the optical character recognition program is from Caere Corporation of Los Gatos, Calif. Other OCR programs can be used. The fields information extraction routines extract specific information for the relational database 230 from the information supplied by the optical character recognition program.

In one embodiment, OCR 210 provides a text file 217, a positions file 213 and the fields information 211. The text file 217 includes the text of the original document 201 as determined by the OCR 210. The OCR 210 optionally creates the positions file 213. The positions file 213 relates the positions of the words and characters in the text file 217 to their corresponding locations in the image file 205. In one embodiment, the positions file 213 includes an XDOC (or PDA) file generated by the OCR 210. In one embodiment, the positions file 213 includes the text file 217. In one embodiment, the full text file 217 includes the positions file 213.

In one embodiment, the OCR 210 automatically generates the fields information 211. The fields information 211 can be used by the user to locate documents of interest. Importantly, the system automatically generates the following fields information 211 for a scanned image: a document description; the Bates number; the document date; the type of document; and the names of people, places or objects. The fields information 211 can also include page numbers, product references, and any other information that can be obtained when the OCR 210 processes the image file 205. The fields information 211 allows a user to perform searches using special fields. In one embodiment, a program, separate from the OCR 210, extracts the fields information 211. In one embodiment, the fields information 211 is extracted interactively with help from the user.

The OCR 210 automatically generates the document description. The document description includes the first 40 characters of the text corresponding to an image. In one embodiment, the first 40 characters of a line from the text file 217 that has fewer than twenty percent word spelling errors are used. In another embodiment, a different number of characters are used and a different spelling error percentage is used.

In one embodiment, the OCR 210 finds the Bates number for a document by searching for a string that conforms to a Bates number. A conforming string is a multiple digit number sequence, number-letter sequence or letter-number sequence, without any adjacent words. Words are not adjacent if the spacing is greater than three times the average word spacing of the area. Bates numbers are also detected where a word is rotated differently than other words in the area. Additionally, within a document, each page should have a Bates number and the system can automatically assign Bates numbers where it has only recognized some Bates numbers of pages in a document. For example, if a Bates number is detected for the first and third pages, but not the second page, the Bates number will be automatically assigned for the second page. If no Bates number is determined for a page, the user is prompted to supply the Bates number. In one embodiment, the system can prompt the user for the Bates number of some pages after the system batch scans many pages.

In one embodiment, the OCR 210 finds the document date by searching for a text string that conforms to a date. The OCR 210 searches the document by examining the text of the top right quadrant of the document for a text string that conforms to a date. If a date is found, the date is then standardized, that is put into a standard form, before being put into the relational database 230. If a date is not found in the top right quadrant of the document, the other quadrants are then searched. If no valid date is found, the user is prompted to enter a date.

The type of document can be: a letter/correspondence, a memo/note, a deposition, a graphic/chart, article, and/or a news story. The type of document can be determined by looking for keywords, such as "memo" or "memorandum", or by examining the format of the document.

The OCR 210 provides the text file 217 to the full text database 220. The full text database 220, in one embodiment, includes the program MG from the University of New Zealand. The full text database 220 indexes every word of every page of the text file 217. That is, it creates a large index for every word in all the files provided to it. The text file 217 is then stored in a compressed format by the full text database 220. In one embodiment, the full text database keeps compressed versions of the text file 217.

In another embodiment, a second database is maintained for character graphics text and notes entered by a user. In another embodiment, the second database includes a number of other databases, each for maintaining different text information pertaining to an image. For example, the second database can include a database for the character graphics and another database for the notes associated with an image. The character graphics text is text that is displayed as part of a visual enhancement to an image. The notes can be any text that a user may want to enter for a document. Importantly, to perform a search of a full text database, the database first creates an index of every word in the full text documents. Creating the index can be very time consuming for a database with a great deal of data, such as the full text database 220. In one embodiment, because the second database will likely have much less data than the full text database 220 (only notes and character graphics text for specific documents, as opposed to the complete text of every document), the second database can be re-indexed much more quickly than the full text database 220. Thus, the second database can be re-indexed as the user enters text for a character graphics or notes. Thus, the user can perform not only a full text search of the text files but also of any character graphics text or notes entered by the user.

In one embodiment, the scanner 200, the OCR 210, the full text database 220 and the relational database 230 can be used separately to enter the image information into the databases. The databases can then be accessed from the rest of the system. This allows, for example, a file clerk to scan and OCR the documents on a different computer system than is used to perform searches. Further, multiple scanner's can be used in parallel to speed up the process. In one embodiment, scanning and OCR'ing are done by another system, and the results are fed into the databases.

A document/image ID 225 identifies each document image in the system. The document/image ID 225 uniquely identifies each document within the system. In one embodiment, the document/image ID 225 includes a document number and a page number. In another embodiment, the document/image ID 225 can be generated from the fields information 211 or can be assigned by a user.

The OCR 210 does not have to provide a 100% accurate identification of the text in the image file 205. Importantly, the OCR 210 and the full text database 220 are used to help in the creation of presentations by helping the user locate original images. The correctness of the text file 217 is not crucial to the presentation because the presentation is based around the original images. It is the visual impact of the original image, and any visual enhancements to the original image, that allows the user to make a persuasive presentation. Thus, the OCR 210 and the full text database 220, through the use of a full text search engine, that includes, for example, fuzzy logic and Boolean logic, allows the user to locate particular images and helps automate the creation of the presentation. Further, the fields information 21 I can be used in combination with the full text database 220 searching to locate the images in which the user is interested.

In one embodiment, the relational database 230 includes the Gupta database from Gupta Corp. of Menlo Park, Calif., or Postgress from UC Berkeley, Calif. In another embodiment, other databases, such as a database from Sybase or Oracle, can be used. In another embodiment, non-relational databases can be used.

The presentation database 240 is a database which provides an organization for the presentation of some of the information in the system. That is, a user can store the organization of a presentation in the presentation database 240. The presentation database 240 receives and transmits organizational information 245 that describe the organization of a presentation. In one embodiment, the presentation database 240 stores treatment information for a presentation. The treatment, in combination with some general visual enhancement controls (called a script), tell the system how the document image should be displayed. A treatment includes a reference to a document image and a description of the visual enhancements to that document image. Importantly, a treatment does not have to include the actual enhanced image. By not storing the enhanced images, the data storage requirements of the system are reduced significantly. The treatments and the benefits of using treatments are described in greater detail below. In one embodiment, a treatment is referenced in the presentation database by the following information: a bin identifier (e.g. a bin number), a document identifier (e.g. a document number), a page identifier (e.g. a page number within the document) and a treatment identifier (e.g. a treatment number). Additional treatment identifying information can include a region of interest identifier (e.g. a region of interest number), and a specific treatment description (e.g. a blow-up identifier indicating that the region of interest should be shown as being blown-up). The treatments and the regions of interest are described in greater detail below.

Note, in one embodiment, the full text and/or field based searches can be restricted to find only the documents already in a specific presentation. This feature helps a user find specific documents within a presentation.

The control and interface 260 provides the interface to the user of the system and controls the interactions between the various components of the system. Further, the control and interface 260 allows the user to initiate searches, display images and organize presentations via the user terminal 280. During a presentation, the control and interface 260 presents enhanced images of original documents to the audience display devices 270.

An important aspect of one embodiment of the invention is that the treatments are applied to the display of the original image and are not stored as a permanent change to the image file 205. The computer system 100 accesses the image file 205 and the treatment and applies the visual enhancements during the presentation. This is important for a number of reasons. First, for legal reasons, it may be necessary to view the original, unenhanced image, so storing permanently altered images is unacceptable. Second, an image file 205 can be stored relatively efficiently without having to include color information or high resolution visual graphics enhancements. Third, any difference in the display devices or the display environments (e.g. whether the room in which a presentation is being made is well lit or not may determine the choice between using yellow or green as a highlighting color) can be compensated for more easily because the visual enhancement can be more easily altered.

In one embodiment, the programs of FIG. 2 can communicate through inter-application communications. In one embodiment, ToolTalk, from Sun Microsystems of Mountain View, Calif., is used to allow programs to communicate with each other.

MAIN DISPLAY

Figure 3:
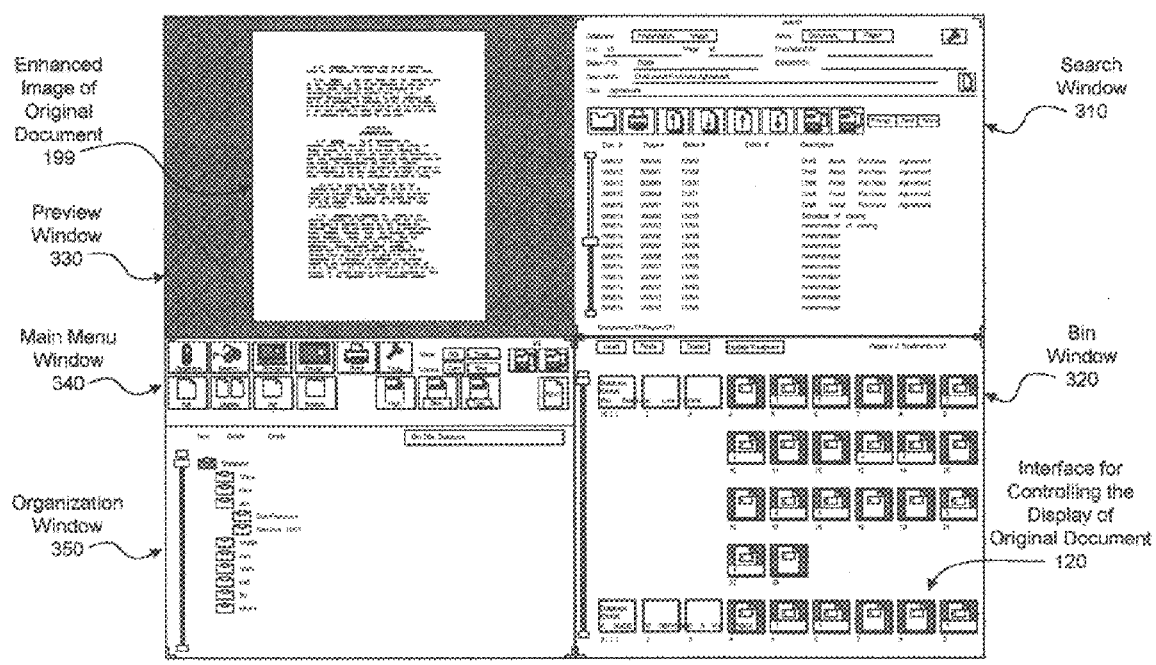
FIGS. 3, 3a and 3b illustrate a display of the computer system of FIG. 1.
Figure 3A:
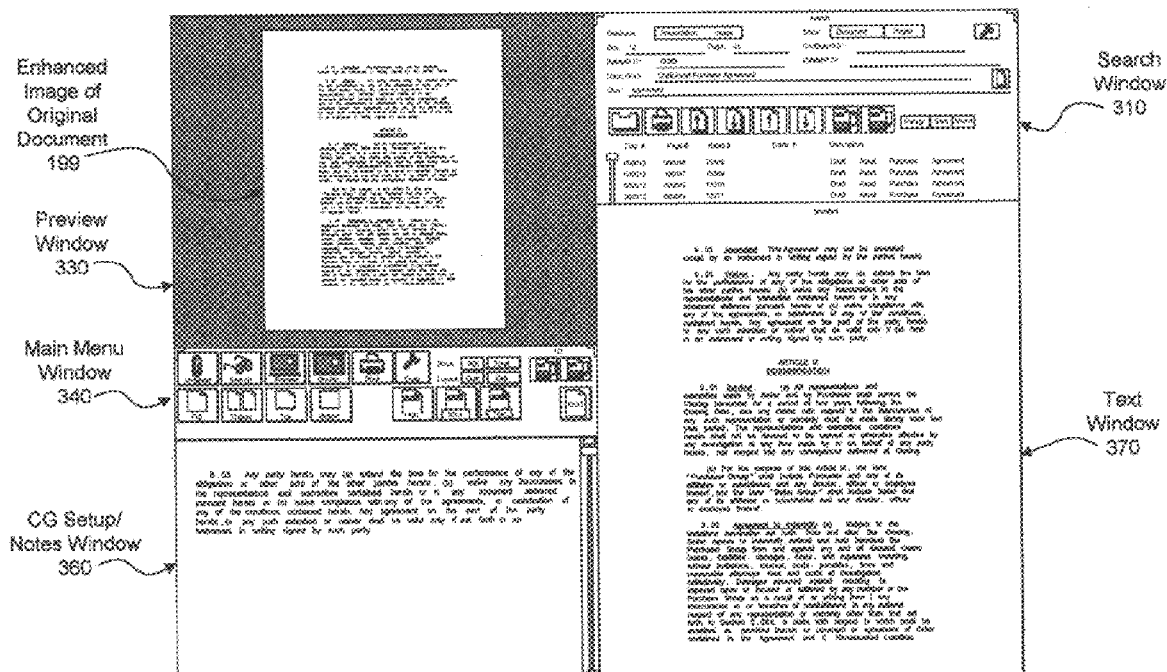
Figure 3B:
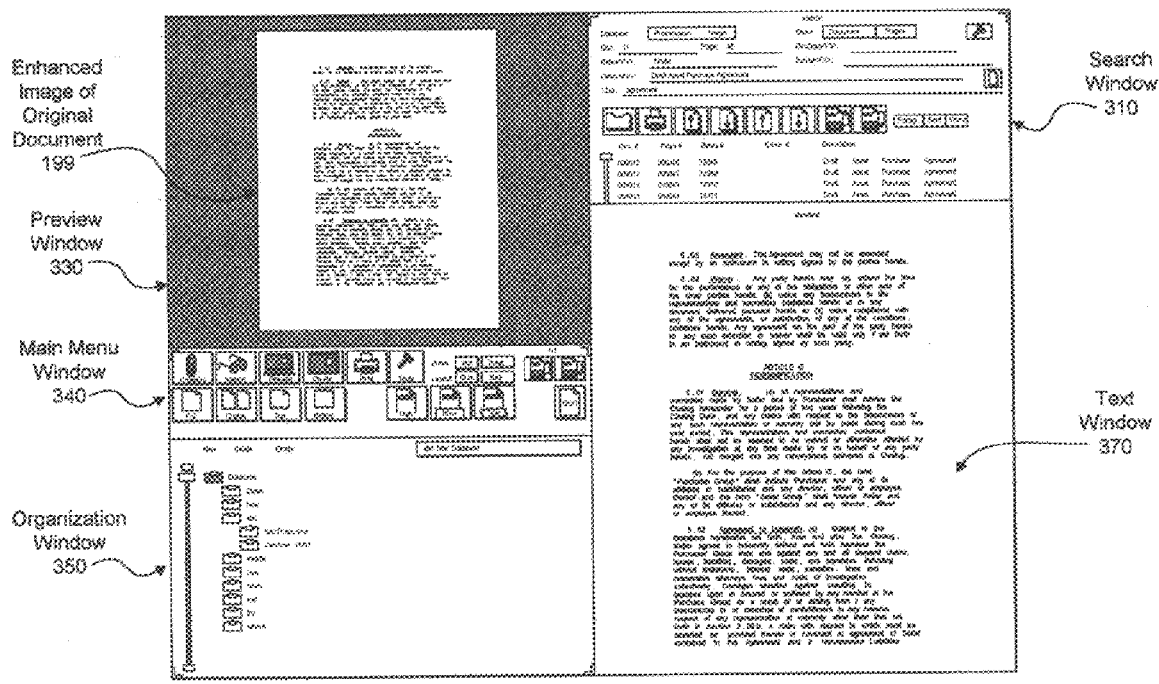

FIGS. 3, 3a and 3b illustrate the main display of computer system 100 (the interface for controlling the display of original documents 120). The interface for controlling the display of original documents may include the following: a search window 310, a preview window 330, a main menu window 340, an organization window 350, and a bin window 320, a CG (character graphics) setup/notes window 360 and a text window 370 can also be part of the interface.

The search window 310 allows a user to search the full text database 220 (and the second database having the CG text and notes text) and to the relational database 230. The results of a search are displayed in search window 310. A user may select a match from the search window 310, and have it displayed in the preview window 330. The search window 310 provides the search term to the appropriate database. A search term is not restricted to a single type of search. A search term can be a culmination of searches by other search terms. For example, a search term can represent a search of a set of documents having a date after Aug. 24, 1994; the set of documents being found by a search for documents satisfying the search term "'Agreement' AND 'Warranty'." Further, a search term can include a combination of other search terms. For example, a search term can be the search term "NOT in the range Feb. 3, 1956 through Aug. 24, 1994" and another search term.

The preview window 330 displays a photo-realistic image of an original document. That is, preview window 330 will display all, or part of, one, or more, images files 205. In this example, the preview window 330 is displaying an enhanced image of an original document 199. In one embodiment, multiple image preview windows 330, each including an image, can be shown on the display device 121. In one embodiment, a preview window 330 can display multiple different images. When making a presentation, only the preview window 330 is displayed on the audience display devices 270, using a second display driver/video card or some other device to provide a secondary, or independent, display, which can be full screen. This is called the "on-air" mode.

Displaying a photo-realistic image is important for users who want to make a persuasive presentation. It adds legitimacy to their presentation. It is also important to see, and present, the original document without having to use the original document. The user does not have to retrieve the document from storage for example. Further, because the original documents do not have to be retrieved from storage, the integrity of the original documents is maintained. That is, the original documents will not be lost or damaged because they do not have to be retrieved from storage. Further, multiple users can simultaneously view the images of the original documents. For example, in one embodiment, multiple users on a network can access and view images. In another embodiment, multiple users share images by teleconferencing thereby allowing the users to discuss the contents of an original document.

The main menu window 340 provides the user with general controls for the system.

The organization window 350 also allows a user to generate a presentation. The organization window 350) further allows a user to organize images and then create treatments for those images (this is similar to process described in relation to FIG. 5) independently of a presentation.

The bin window 320 shows a graphical representation of the available treatments for a set of document images. Each treatment is shown as an icon. In one embodiment, a treatment icon includes a treatment ID (bin number, document number, page number, treatment number), a description of the document (the document description field), a visual representation of the visual enhancement, and the search term used to find the document. The visual enhancement can include a thumbnail picture of the specific visual enhancement. For example, the visual enhancement may be a thumbnail picture of a highlight or a blow-up. In another embodiment, the visual enhancement is a written description of the enhancement, for example, "blow-up" or "tear".

The character graphics setup/notes window 360 allows the user to view text that is to be displayed as part of a treatment for of image. The character graphics setup/notes window 360 can also be used by a user to add character graphics text and/or insert images for display and treatment with the document image, or can be used to add notes to be associated with the document image (not necessarily displayed). These features are described in greater detail below.

The text window 370 includes the text file 217. A user can select a document from the search window 310. The corresponding text file 217 will be displayed in the text window. The user can then see not only the text, but also the image file, displayed.

AUTOMATED IMAGE ENHANCEMENT

The following discussion relates to the automatic creation of presentations. In one embodiment, the user can automatically generate visual enhancements for many images thereby reducing the time needed to prepare a presentation. To illustrate this process, assume the user wishes to create a closing presentation for a trial. The user wishes to include documents that reference the word "agreement".

Figure 4:
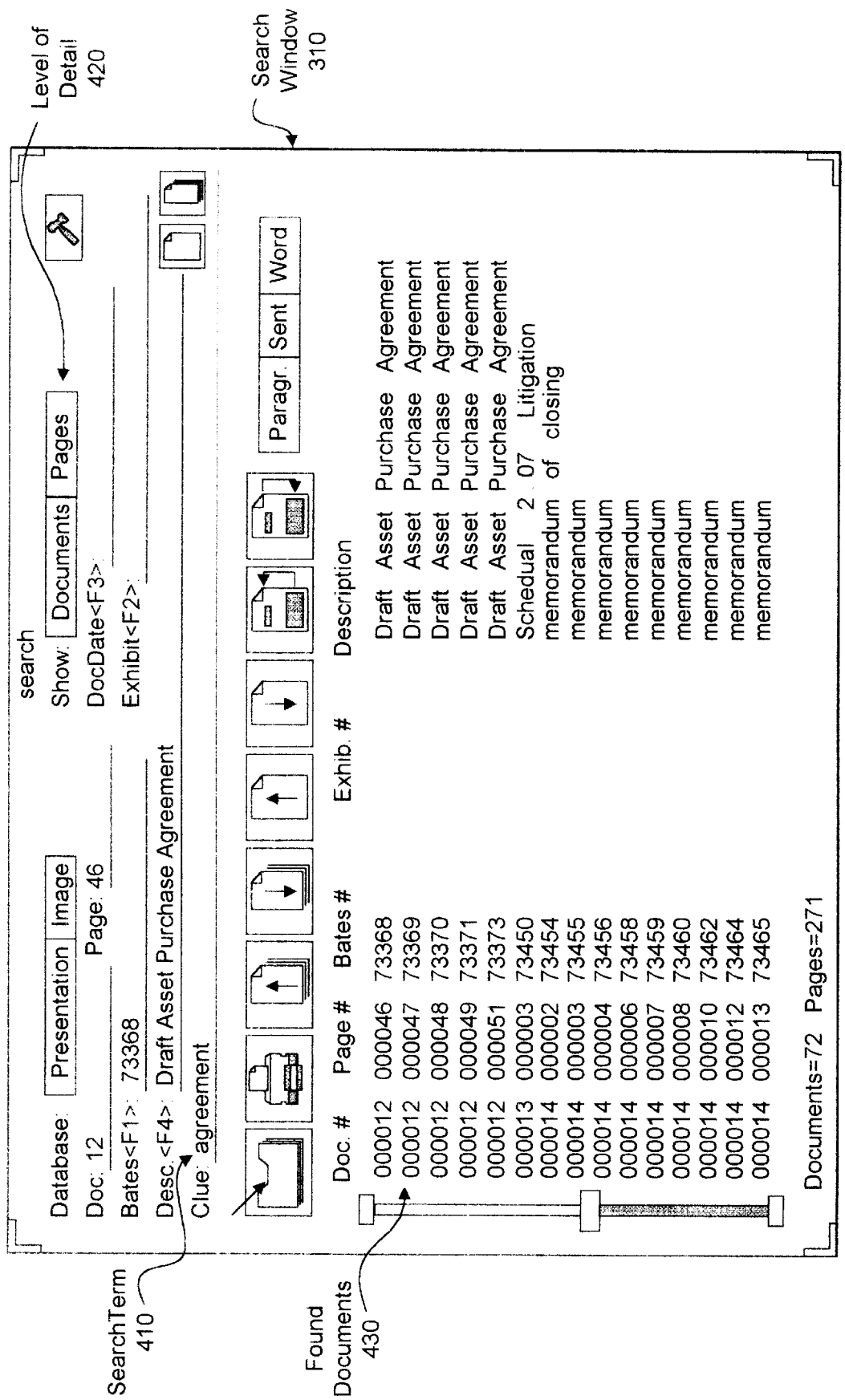
FIG. 4 illustrates a search window.

FIG. 4 illustrates an enlarged view of the search window 310. In this window, the user can enter the search term 410 (clue) of "Agreement." The search window 310 communicates the search request to the full text database 220. In one embodiment, the search window 310 communicates the search request to a full text database created from the positions files 213 for performance improvements. The full text database 220, in this example, has found seventy-two documents of which a subset of those are identified by found documents 430. Five pages of the document number 000012 include references to the word "agreement." In this case, because the level of detail 420 set to PAGES, references to all five pages are shown. Note that a document can include one or more pages; each page being a separate image.

Assume now, that the user wishes to review and possibly include some or all of the images containing "Agreement," in the presentation. The user can then select the image of interest. A corresponding image is displayed in the preview window 330. Thus the user can quickly look through and read the relevant portions of the documents to determine which images to enhance and include in the presentation.

Once a document, or a number of documents, have been identified to be included in the presentation, the user need only select the document(s), from the search window 310, and drag and drop it (them) into the bin window 320. In one embodiment, the drag and drop is performed by communicating the document/image ID 225 of the selected document to the bin window 320. The computer system 100 then automatically generates a number of predefined/user defined treatments for each image. In this embodiment, a full image treatment, a top portion treatment, and a bottom portion treatment, with the regions of interest highlighted, are generated for each page. The automatically generated treatments are displayed as icons. The user can view the treated images and include some or all of the treatments in a presentation. In previous systems, the user would be required to manually enhance a particular image. Thus, in one embodiment, the amount of work required to prepare the images is reduced substantially. Further, in some systems, the user would have to save the permanently changed image. However, in one embodiment, the treatments are directions to the system as to how to display the image, they are not permanent changes to the image. Therefore, it is much easier to change the visual enhancements of many images in our system.

Figure 5:
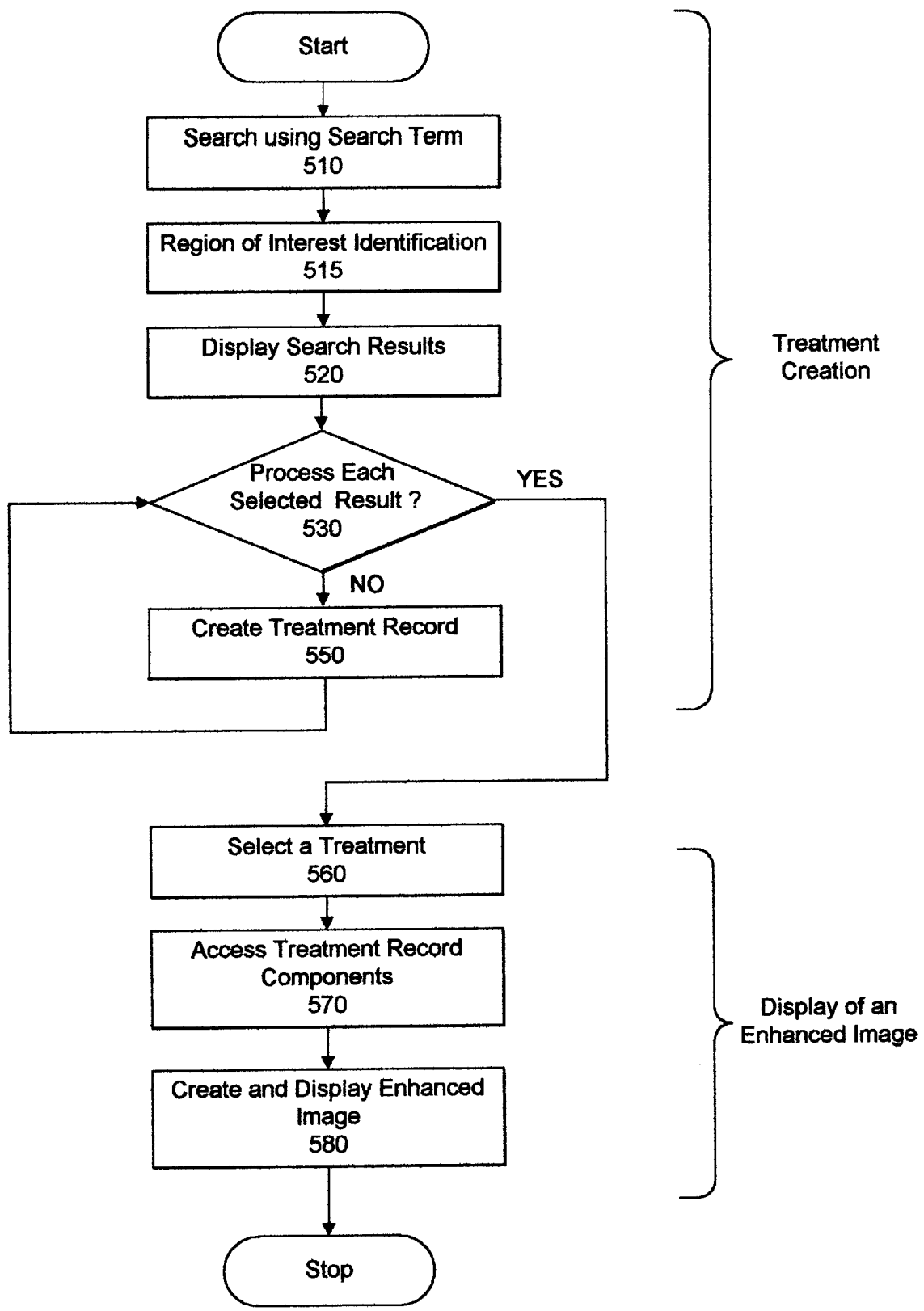
FIG. 5 illustrates an embodiment of a method of generating visual enhancements.

FIG. 5 illustrates an embodiment of a method of automatically generating enhancements for the display of an image. A large number of document images can have visual enhancements automatically created using this process. FIG. 5 also illustrates a method of displaying an enhanced image.

At step 510, a search is performed using a search term. The search term can include any number of other search terms and can represent multiple searches. What is important is that some set of images have been identified which satisfy the search term. In one embodiment, each image corresponds to a page of a document.

At step 515, the regions of interest for the set of images are determined. Importantly, a region of interest defines an area of the image that corresponds to the position of the search term's matching text in the text file 217 or the positions file 213. The region of interest can define any area on the image that corresponds to the search term. The region of interest is described in greater detail below.

At step 520, the search window 310 displays the results of the search of step 510. The user can select a subset of the results for which treatments are to be created. This step is optional as the system can automatically create treatments for all the results.

At step 530, a test is made to determine if all the treatments have been generated for the selected results.

At step 550, the system creates a treatment record that has a reference to the image file 205, the positions file 213, the text file 217, and the general and specific treatment characteristics (described below). The treatment record also references the regions of interest created for a particular image. In one embodiment, the definitions of the regions of interest are kept in the record. In one embodiment, the regions of interest are kept in a database and are referenced by the treatment. In one embodiment, the treatment record also includes all the ASCII text for the character graphics, if any. The treatment record is described in greater detail below. In one embodiment, the newly generated treatments are shown as icons in the bin window 320.

The treatment characteristics identify the general characteristics and some of the specific treatment characteristics of the automatically created treatments. The general treatments can be included in a "script." The script defines a common look for all the treatments created with that script. For example, a general treatment characteristic called the drop shadow defines the look of the drop shadows applied to the display of an image. A specific treatment characteristic is, for example, a blow-up that defines that a blown-up region of interest is to be displayed with the image. Multiple treatment characteristics may be combined to create one treatment. For example, to create a treatment some general characteristics and some specific characteristics are included in the treatment. Also, multiple treatment characteristics can be used separately to create multiple treatments for a specific image. The user can then pick among the treatments to determine which one to include in the presentation. Different treatments are illustrated in FIG. 7 through FIG. 11.

After the treatments are created, a user can then have the system display an enhanced image from one, or more, of the treatments. The user need not wait until all the treatments are created to display an enhanced image. Note, in one embodiment, the system can display an enhanced image without first creating a treatment record. The system merely applies the visual enhancements directly to the image being displayed.

At step 560, the user selects a treatment icon from the bin window 320. This causes the system to access the corresponding treatment record.

At step 570, the system analyses the treatment record. This includes identifying the image file 205 that corresponds to the treatment and the general and specific treatment characteristics to be applied when the image is displayed. The other information referenced by the treatment record may also be accessed (such as the regions of interest, and any notes text associated with the image).

At step 580, the system displays an enhanced version of the image by executing the treatment characteristics (general and specific) identified by the treatment record.

At this point, the user can modify the visual enhancements by using the main menu window 340 (e.g. to change the script used), the preview window 330 (e.g. to change the size of a region of interest), and/or the CG setup/notes window 360 (e.g. to change the text being displayed in the preview window 330). The user can also select which treatments, of the automatically generated treatments, to include in a given presentation. To include a particular treatment in a presentation, the user can select the treatment by selecting a treatment icon from the bin window 320 and dragging and dropping the treatment into another bin in the organization window 350.

Also note that a user can manually create treatments for storage in the bin window 320. For example, the user can select a file from the search window 310, have the corresponding image displayed in the preview window 330, apply various visual enhancements through the main menu window 340, and have the new treatment added to the bin window 320.

REGIONS OF INTEREST

Generally, a region of interest is an area of an image that a user wishes to emphasize. This area may include graphics, handwriting, text, or a combination of these.

Figure 6:
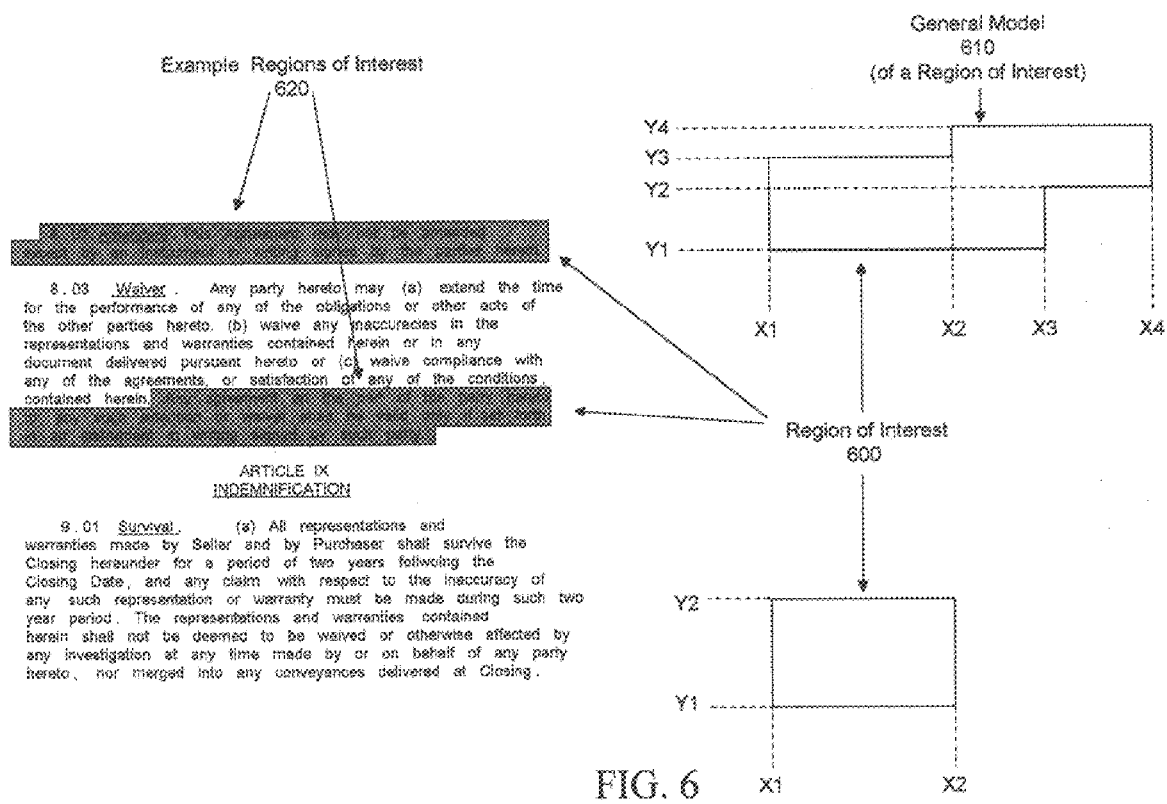
FIG. 6 illustrates a region of interest.

FIG. 6 illustrates the general model 610 of a region of interest 600 and two example regions of interest 600.

The general model 610 can be any of a number of polygons. For example, the general model 610 can be defined by two, four, or six defined coordinates: {(x1, y1), (x2, y2)}; {(x1, y1), (x2, y2), (x3, y3), (x4, y4)}; {(x1, y1), (x2, y2), (x3, y3), (x4, y4), (x5, y5), (x6, y6)}. Other general models 610 could also be used, such as by defining the region of interest 600 by some other polygon or by a number of spline curves. However, the general model 610 requires only a few points to define the region and still provides enough flexibility to identify most areas (text or otherwise) in an original image.

Regions can be defined directly by the user in the preview window 330, or they can be generated from the results of a full text search or a fields search. By using the positions file 213 and the location of the matching string in the text file 217, a region of interest 600 can be generated for each hit of a search (a hit is text that matches the search term). Thus, each automatically generated region of interest 600 defines an area of an original image that contains text that matches the search term.

In one embodiment, the outlines of a number of regions of interest 600 are shown simultaneously. This can occur where, for example, a signal page has multiple occurrences of text that matches a search term. Each region of interest 600 is identified by a number. The user can then select a particular region of interest 600 and have a specific treatment created for it.

A region of interest 600 can be within another region of interest 600.

The regions of interest 600 can be parameterized to be a character, word, line, sentence, paragraph, or section of the text of the document. These regions of interest 600 can then be used to automatically generate treatments for a presentation.

The control and interface 260 determines "sentence" regions of interest 600 using the following process. The text string matching the search term is located in the text file 217. The letters in front of the text string are searched until a capital letter is found. If a capital letter is found, then the positions file 213 is accessed to determine whether the space preceding the capital letter is greater than one and one half times the average spacing between words for that area of the image. Also, the character preceding the capital letter is checked to determine whether it is a sentence ending character (e.g. period, question mark, exclamation mark). If the spacing before the capital letter is greater than one and one half time the average spacing and the previous character is a sentence ending character, then the capital letter is the beginning of the sentence. A similar process is used to find the end of the sentence. The region of interest 600 is then defined by the position of the first character in the sentence and the last character in the sentence. A constraint is placed on the sentence identifying algorithm. That is, a sentence cannot extend over a paragraph boundary. Additionally, such factors as embedded codes in positions files 213 can be used to find sentences. Paragraph boundaries are defined by the spacing between regions of text on the page and factors such as embedded codes in positions files 213.

Optionally, the user can select text strings from the text window, described above, and have the control and interface 260 generate a corresponding region of interest 600 for the image.

VISUAL ENHANCEMENTS

An important advantage is the number and types of visual enhancements that can be applied to the original images when they are displayed. FIGS. 7 through FIG. 13 illustrate some of the high resolution visual enhancements that can be added to the display of an original document to add impact to a presentation.

Figure 7:
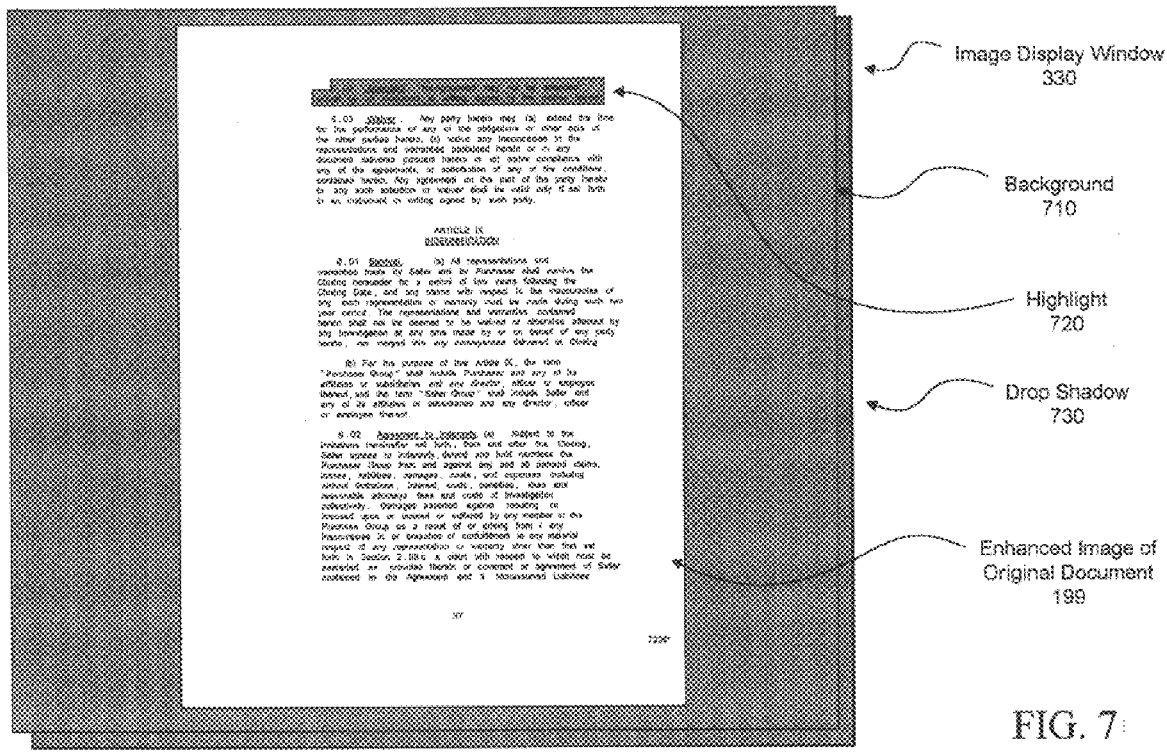
FIG. 7 illustrates an enhanced image of an original document.

FIG. 7 illustrates the preview window 330 with visual enhancements used in one embodiment of the invention. In this example, a background 710 has been included. The enhanced image 199 is shown. The control and interface 260 automatically positions the enhanced image 199 in the preview window 330 according to set positioning rules. In one embodiment, the enhanced image 199 is positioned and sized to maintain a minimum of ten percent background margin around the enhanced image 199. Additionally, in one embodiment, a drop shadow 730 for the enhanced image 199 is added. In the preferred embodiment, the background margin and the drop shadow 730 is performed for each image that is displayed.

In this example, a highlight 720 is applied to the region of interest 600. The highlight 720 is a visual treatment that draws the audiences' eye to the region of interest.

Figure 8:
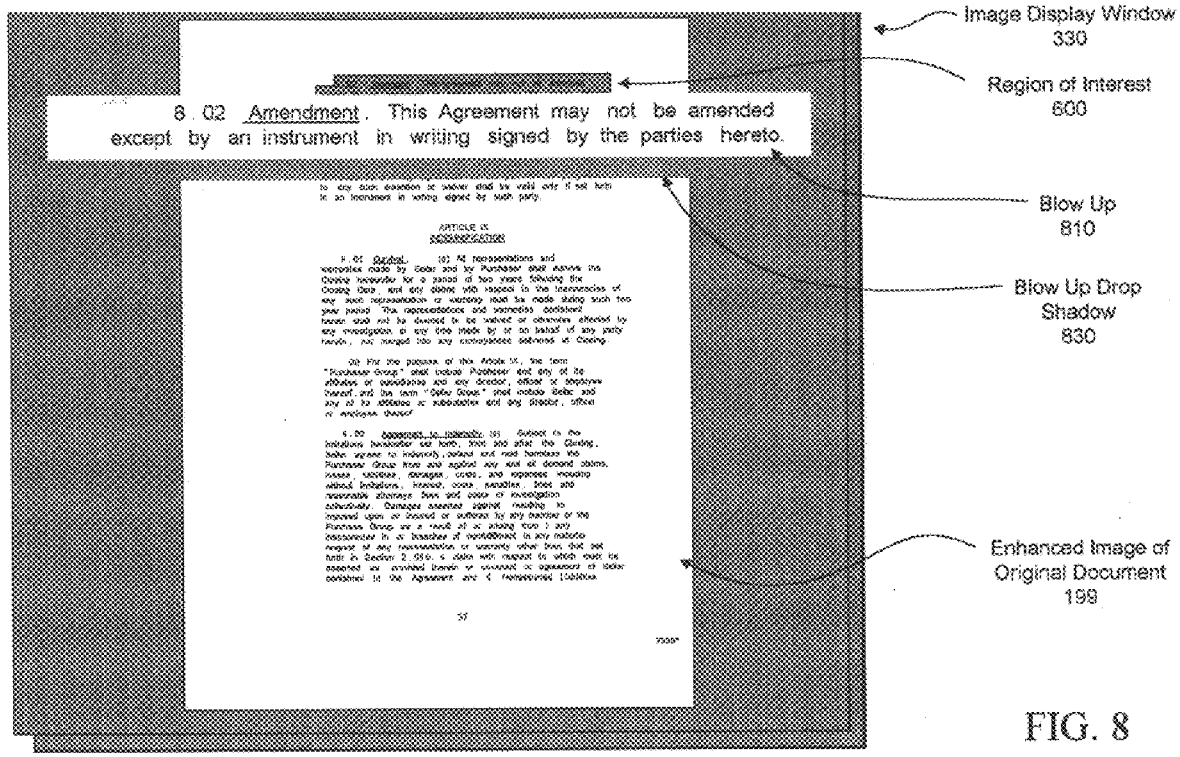
FIG. 8 illustrates a blow-up.

FIG. 8 illustrates a blow-up 810. A set of rules is used so that the displaying of the blow-up 810 does not block the region of interest 600. The set of rules examine the number, sizes and locations of the region of interests 600, what highlights are to be applied, and how much space is available for displaying the image. A blow-up drop shadow 830 can be automatically added. Other blow-up 810 visual enhancements can be added such as a transparency, a color, a border effect and an edge effect. The boarder and edge effects can have independent transparency and color. The blow-up drop shadow 830 can have transparency, color, boarder effects and edge effects independent of the blow-up 810. The blow-up drop shadow 830 can be sized and positioned. The blow-up allows the audience to more easily see the identified region of interest 600.

Using the region of interest 600 coordinates and the size of the blow-up area, the blow-up is generated by sampling the image file 205. Note that the image file 205 is usually a higher resolution than the enlarged image. Therefore, in one embodiment, subsampling is used. However, in another embodiment, the image file 205 is a lower resolution than the available display resolution. In this embodiment, pixel interpolation is used.

Figure 9:
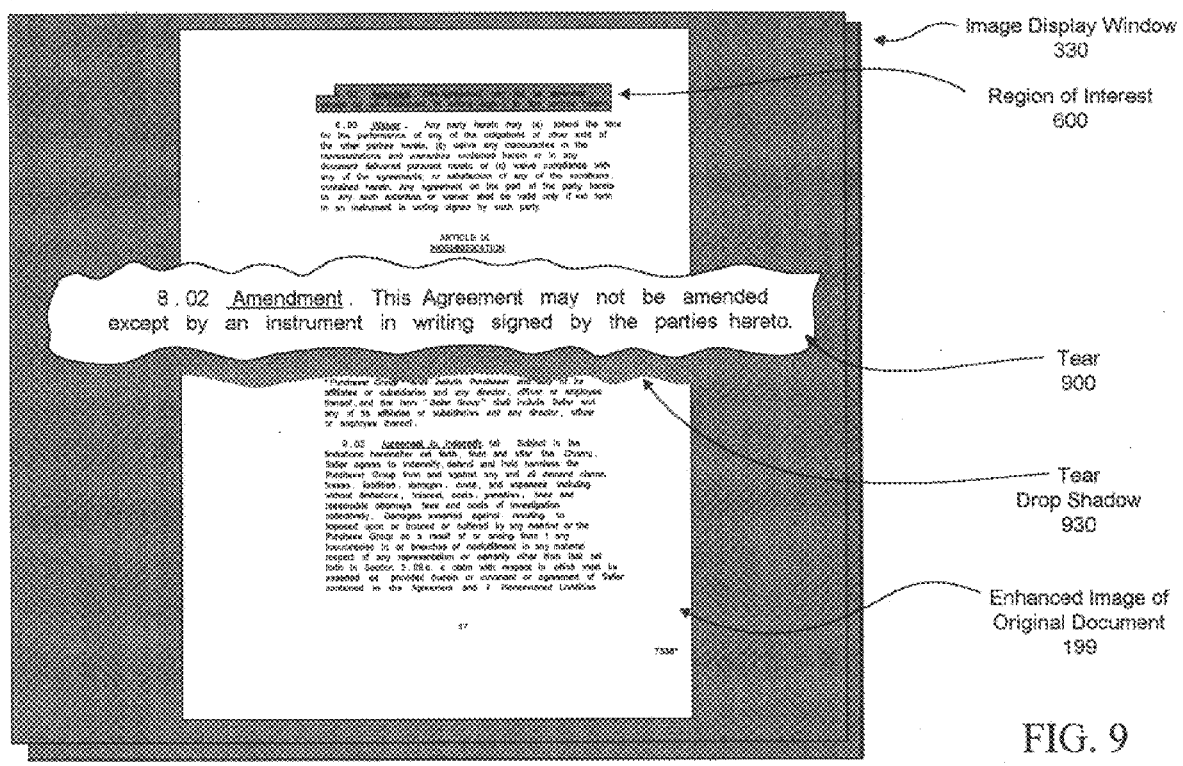
FIG. 9 illustrates a tear.

FIG. 9 illustrates a tear 900. The tear looks like a torn piece of paper. Given the region of interest 600, the control and interface 260 displays an enlarged view of the original document. The control and interface 260 adds a torn edge effect. The torn edge effect can be created in a number of ways. For example, it can be created from a combination of fractal geometry and Gaussian blurring. In another embodiment, the torn edge is made from a random sample of scanned torn paper edges. A random seed number is used in either case to ensure each tear looks unique. The random seed number is kept as part of the treatment so that the same torn edge effect will be created every time that treatment is applied to that enhanced image 199. Given the torn edge, a tear drop shadow 930 can also be displayed. The tear 900 can have other visual enhancements similar to those available for the blow-up.

Figure 10:
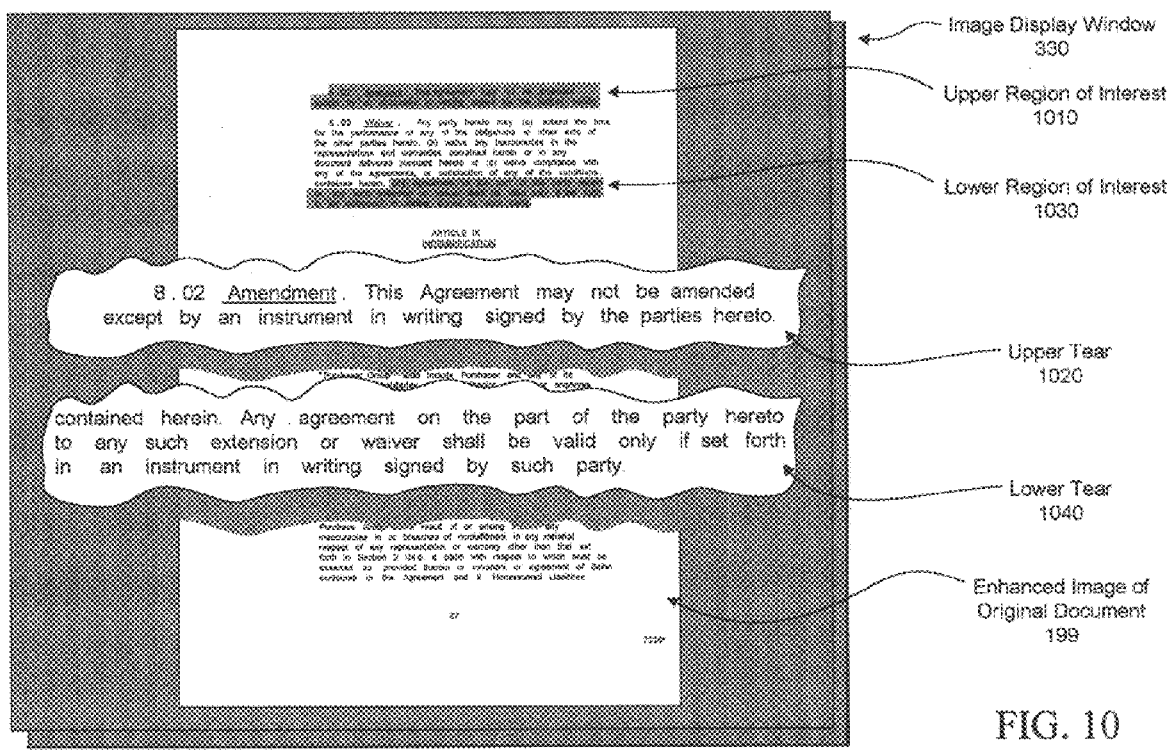
FIG. 10 illustrates two regions of interest.

FIG. 10 illustrates a portion of the original document with two regions of interest 600: upper region of interest 1010 and lower region of interest 1030; with two corresponding tears: upper tear 1020 and lower tear 1040. The control and interface 260 notes the number of tears or blow-ups that are to be displayed and attempts to place them so that they do not overlap and/or according to various centering and sizing rules.

Figure 11:
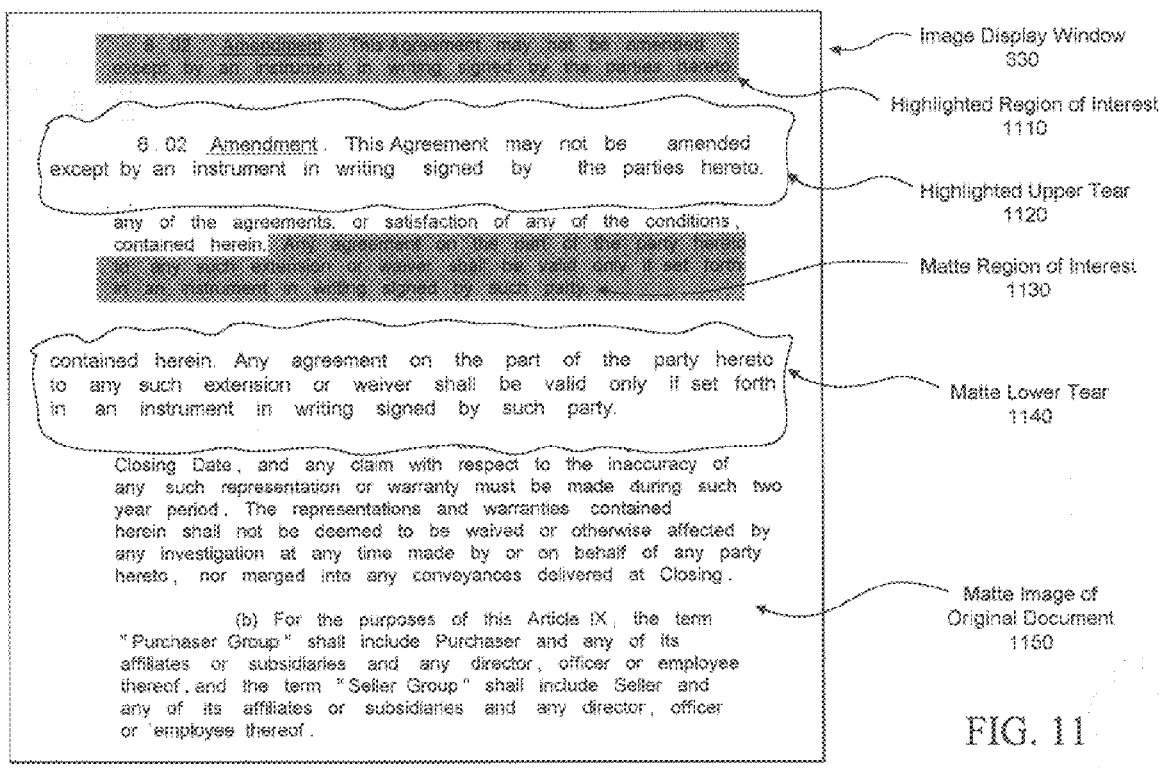
FIG. 11 illustrates an image with a matte effect.

FIG. 11 illustrates the top portion of the original document with a matte back effect. Top, bottom, middle, and full portion display can be included in a treatment. The matte back effect dulls portions of the enhanced image 199 that are less important. In this example, the highlighted tear 1120 is emphasized by dulling the rest of the image.

Figure 12:
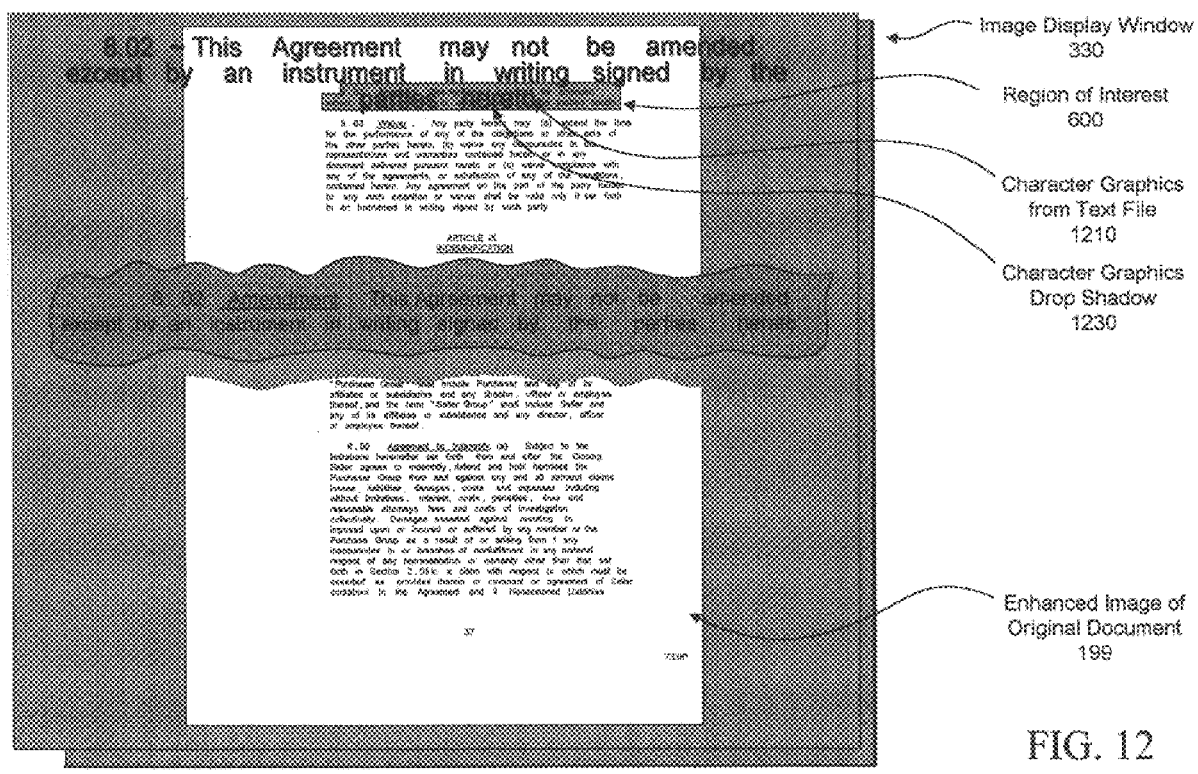
FIG. 12 illustrates character graphics.

FIG. 12 illustrates the use of character graphics. Character graphics can be used when the user wishes to emphasize the words in a given portion of the document. In this example, the control and interface 260 has, given the region of interest 600, automatically supplied the character graphics from the text file 1210. That is, the control and interface 260 has accessed, using the corresponding positions file 213, the text from the text file 217. The text has then been rendered and displayed in the preview window 330. A character graphics drop shadow 1230 can optionally be added. The character graphics can also have other visual enhancements such as those associated with the blow-up. Note that in this example, the OCR 210 has introduced errors into the text file 217.

Figure 13:
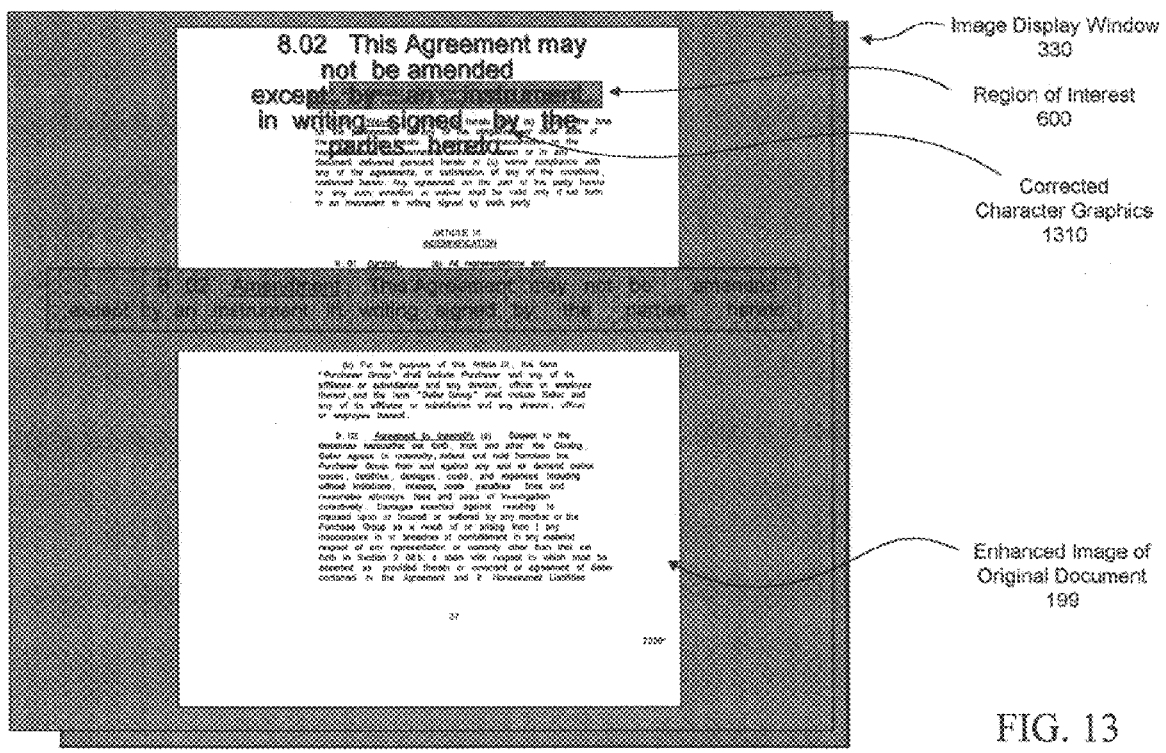
FIG. 13 illustrates corrected character graphics.

FIG. 13 shows the corrected character graphics 1310. The user has changed the character graphics. These corrections are stored as part of the presentation.

Other visual effects can be included. For example, animated character graphics can be displayed. Other animated visual effects can be displayed. Another visual effect is to display two opposing images for comparison. Another visual effect is to display multiple original document images in the form of a book. Given the automatic generation of the region of interest 600, or the manual selection of a region of interest 600, the control and interface 260 can display high resolution visual effects with the display of the original document image.

In one embodiment, a "smart" treatment makes decisions about which visual enhancement should be displayed. For example, the smart treatment displays the text file information (FIG. 12) unless an error has been flagged by the OCR 210 (for example, the OCR 210 can indicate an OCR error in the text file by inserting a '~' where a particular character could not be recognized). If an error is flagged, then the blow-up of the region of interest is used in the treatment instead of displaying the text file information.

ORGANIZING A PRESENTATION

The search window 310, the organization window 350, the main menu window 340, and the bin window 320 allow the user to organize a presentation. The organization window 350 provides a user with access to the presentation database 240.

A presentation is included in the organization information 245. In one embodiment, the presentation includes a number of records. Each record in the presentation database 240 references the following:

- a document number and a page number, are sufficient to uniquely define the image;
- a treatment number. The treatment number identifies the treatment record;
- a bin number for indicating an organizational location of any particular information needed for the presentation;
- a script category (general visual enhancement characteristics) for defining the general look of a displayed image (e.g. what background to include);
- character graphics text including the specific text to be displayed;
- matte back indicates whether to apply the matte effect;
- base image reference which indicates which portion of the image is to be displayed, e.g. the top, the bottom, the middle, or the full image;
- number of regions of interest 600. This is important for determining where to place blow-ups so as to not obscure other regions of interest. In one embodiment, the number of regions of interest 600 can be kept with the image file or elsewhere in the system;
- region of interest 600 identifiers indicate which regions of interest 600 will be displayed and enhanced, in one embodiment the region of interest 600 identifiers include the coordinate geometry of the regions of the interest 600.

Each region of interest 600 in a presentation record includes a treatment for that region. This allows different regions of interest 600 to have different displays for the same image. FIG. 11 illustrates two regions of interest 600 with different treatments.

As noted above, a presentation record identifies a script number. The script can be designed for a particular visual impact depending on the type of presentation. For example, the script for the opening arguments may differ from the script for the closing arguments. The organization database 240 or the relational database 230 can keep the scripts.

A script includes a large description of subelements. Each subelement of a script stores the characteristics of subtreatments, these include:

- background—a raster image reference;
- page layout—indicates the placement and characteristics of the page;
- page types: top, bottom, middle, single, and duplex;
- transparency—of the page;
- tint color—of the page (can be used to make a document image look older by adding a yellow tint);
- placement—how close to the edges of preview window 330 is the enhanced image of an original document 199 displayed;
- drop shadow effect for the all drop shadows to be displayed—this includes the transparency (through to the raster image background), the offset: x, y, and the blur type (e.g. Gaussian blur), the edge effects applied, the boarders used, the color of the drop shadow, the size of the drop shadow, a pattern, and/or a shadow offset;
- page area cropping—crops the document image by a number of pixels (This may be needed where the scanner 200 has added a black edge to the original image. This feature can be automatically disabled if there is writing in the margins of the document image.);
- matte back—dulls the image; highlight—tint, color, transparency, the borders and the edges, additionally the transparency, color, and sizes for the borders and edges can also be included;
- blow-ups—tint, transparency, color, transparency, borders, edges and the color, and the transparency of the borders and the edges;
- tears—tint, color, transparency; and
- random seed number—for any page related pseudo-random effects.

In one embodiment, a script also includes the above information for regions of interest 600 characteristics (e.g. boarders, color). A script can also include character graphics characteristics such as a font descriptor, a font type, bold, size, etc.

A TRIAL NOTEBOOK

Figure 14:
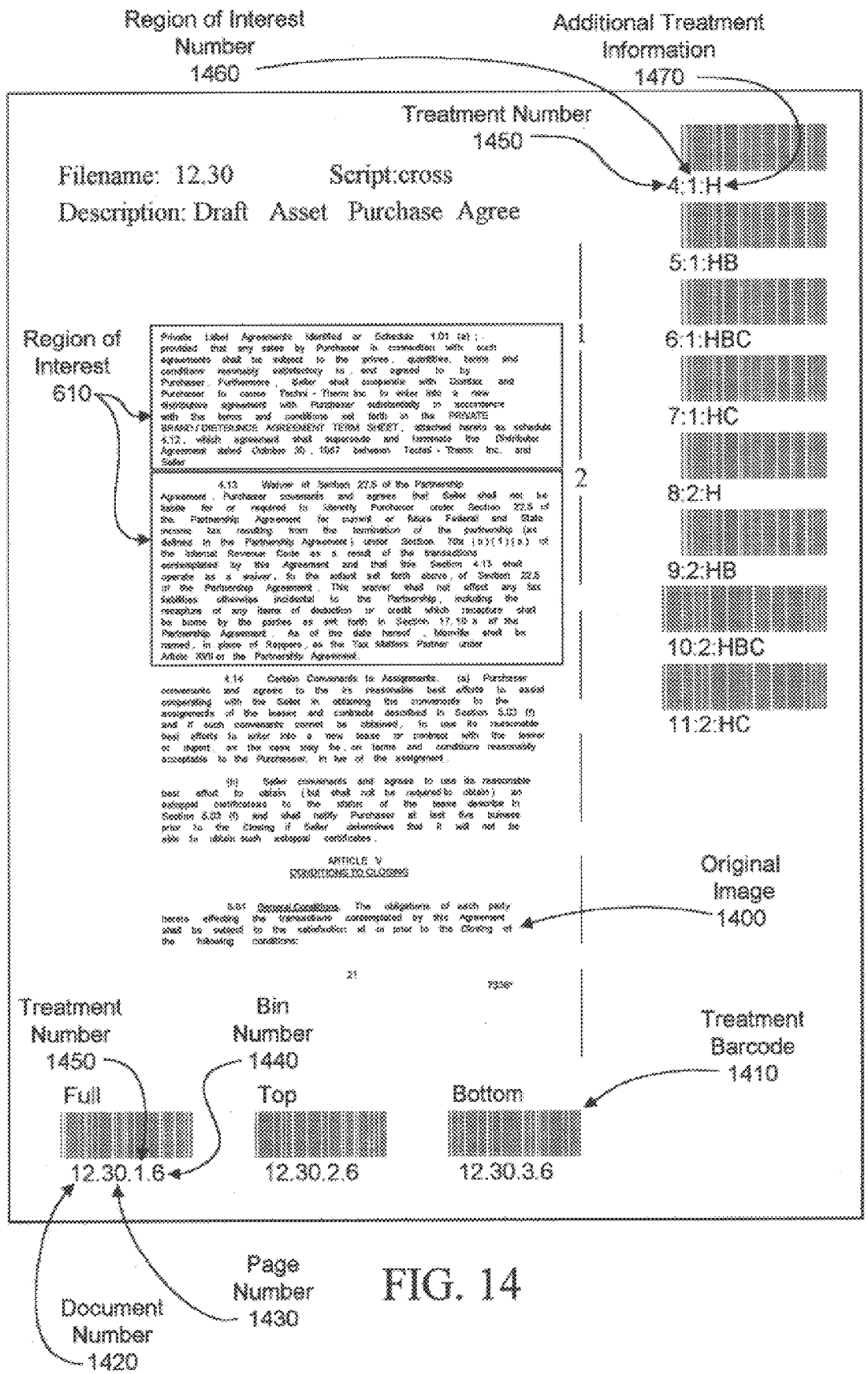
FIG. 14 illustrates a page from a trial notebook that may be used in one embodiment of the invention.

FIG. 14 illustrates one page of a trial notebook. This trial notebook page is generated and used in one embodiment of the invention. Using a bar-code reader, a trial lawyer can scan in a bar-code and have the computer system access the particular image. The computer system then displays the image with the visual enhancements associated with the bar-code.

The trial notebook page includes the original image 1400. As can be seen in the example of FIG. 14, the original image has been printed so as to be readable by the user.

The trial notebook page also includes a number of regions of interest 600. Each 5 region of interest 600 is associated with a number.

The trial notebook page also includes a number of treatment bar-codes 1410. A treatment bar-code identifies the document number 1420 and page number 1430 of the original image 1400. Also identified is the bin number 1440 for that treatment bar-code 1410. For the three bar-codes at the bottom of the notebook page, an "open" (opening arguments) script is used for each. For the bottom left bar-code, the full image is shown. For the bottom middle code, only the top half of the image is shown. For the bottom right bar-code, only the bottom half of the image is shown.

The treatment bar-code 1410 also includes a treatment number 1450 indicating the specific visual enhancement characteristics to be displayed. The bar-codes to the right of the original image 1400 have specific visual enhlancements for the original image 1400. These bar-codes also include the region number 1460 and some additional treatment information 1470 for the region. In this example, the top bar-code identifies that a highlight of the first region should be displayed along with general treatment characteristics associated with "open" . The second bar-code from the top indicates that a highlight and a blow-up of the second region of interest 600 should be displayed along with general treatment attributes associated with "open" .

Thus, a user can include many trial notebook pages in a trial notebook. To present a particular document image, the user need only find the particular trial notebook page with the document image and scan the appropriate bar-code.

It some circumstances it may be very important that the user displays a particular image quickly and efficiently. For example, assume that during a trial, the trial attorney needs to present a particular document image from the trial notebook to the jury. It is very important that at the moment the trial attorney scans the corresponding bar-code, that the image is displayed quickly. However, the computer system can support multiple users which may be using the system to display other graphical information (e.g. other images, search results, etc.). Therefore, in one embodiment, as soon as the attorney scans a particular bar-code, the system immediately goes into "on-air" mode. That is, the system overrides the displaying of the other graphical information and displays the enhanced image corresponding to the bar-code. In the "on-air" mode, the enhanced image is displayed on the audience display devices 270.

Thus, an improved apparatus and method for accessing and presenting information has been described.

What is claimed is:

1. A method of displaying information in a computer system, said computer system including a plurality of document images, a plurality of text files, a plurality of positions files, a first text file of said plurality of text files representing optical character recognized text of a corresponding first document image of said plurality of document images, a first positions file of said plurality of positions files for relating character information in said first text file to a position in said first document image, said method comprising the steps of:

said computer system searching said plurality of text files using a search term to generate a set of found text files, each found text file of said set of found text files including at least a first matching text string to said search term, said set of found text files including said first text file;

accessing said first positions file and said text file, wherein said first positions file being derived from said first document image using optical character recognition, to determine a first region in said first document image corresponding to said first matching text string;

displaying said first document image including displaying a first enhanced view of said first region, said first enhanced view being enhanced relative to a display of said first document image, said first enhanced view being determined from a previously stored visual enhancement definition.

2. The method of claim 1 further including, prior to said accessing said first positions file, said computer system detecting a selection of said first text file.

3. The method of claim 1 wherein said displaying said first document image including displaying said first enhanced view of said first region includes:

displaying a highlighted view of said first region.

4. The method of claim 1 wherein said displaying said first document image including displaying said first enhanced view of said first region includes:

displaying an enlarged view of said first region relative to said displaying said first document image.

5. The method of claim 4 wherein said displaying said enlarged view of said first region includes:

displaying said enlarged view of said first region relative to said displaying of said first document image with a torn edge effect.

6. The method of claim 1 wherein said first text file includes a second matching text string, said method further comprising:

accessing said first positions file to determine a second region in said first document image corresponding to said second matching text string; and wherein said displaying said first document image includes displaying a second enhanced view of said second region.

7. The method of claim 6 wherein said displaying said second enhanced view of said second region includes displaying an enlarged view of said second region.

8. The method of claim 1 wherein said displaying said first enhanced view of said first region includes:

displaying said first matching text string in a region also displaying said first document image.

9. The method of claim 1 wherein said displaying said first enhanced view of said first region includes:

displaying a corrected version of said first matching text string in a region also displaying said first document image.

10. The method of claim 1 wherein said displaying said first enhanced view of said first region includes:

displaying a user inputted text string in a region also displaying said first document image.

11. The method of claim 1 wherein prior to determining said first region, accessing an amount of text indicator, said amount of text indicator indicating which of a word, a sentence and a paragraph if said first matching text string correspond to.

12. The method of claim 1 wherein said displaying said first enhanced view of said first region includes:

displaying a moving version of said first matching text string.

13. The method of claim 1 wherein said displaying said first document image including said first enhanced view includes accessing and using a general display set of characteristics for said displaying said first document image.

14. The method of claim 13 wherein said general display set of characteristics includes a characteristic indicating whether a drop shadow should be displayed when displaying said first document image.

15. The method of claim 1 further including:

displaying a second enhanced view of said first region, said second enhanced view being enhanced relative to said first enhanced view of said first region.

16. A computer implemented method of displaying an enhanced view of an image on a computer system, said computer system including a processor, a memory and a display, said processor being coupled to said memory and said display, said computer implemented method comprising the steps of:

said computer system accessing a first enhanced view record, said enhanced view record identifying a first document image, a region of interest, and a set of visual enhancement characteristics, said region of interest defining a region on said first document image, said first document image having been used to generate a positions file and a text file through optical character recognition, the first document image being related to said positions file and said text file by a set of regions, said set of regions being created as part of creating said positions file and said text file, said region corresponding to a region in said set of regions;

said computer system displaying a portion of said first document image; and said computer system displaying an enhanced view of said region of interest, said enhanced view being determined by said set of visual enhancement characteristics.

17. The computer implemented method of claim 16 wherein said computer system accessing said first enhanced view record is in response to a field search of a plurality of fields data for a plurality of fields, said plurality of fields data corresponding to a plurality of documents.

18. The computer implemented method of claim 17 further including generating a document date data of said plurality of fields data, said method further including the steps of:

accessing a text file corresponding to said first document image, said text file including a text string included in said first document image;

accessing a positions file, said positions file spatially relating a first character in said text file to a first coordinate on said first document image;

searching said text file for a date text string using said text file and said positions file;

generating said document date data from said date text string; and wherein said field search includes searching a date field using a date search term corresponding to said document date data.

19. The computer implemented method of claim 17 further including generating a Bates number data of said plurality of fields data, said method further including the steps of:

accessing a text file corresponding to said first document image, said text file including a text string included in said first document image;

accessing a positions file, said positions file spatially relating a first character in said text file to a first coordinate on said first document image;

searching said text file for a Bates number text string using said text file and said positions file;

generating said Bates number data from said Bates number text string; and wherein said field search includes searching a Bates number field using a Bates number search term corresponding to said Bates number data.

20. The computer implemented method of claim 17 wherein said plurality of documents includes a set of documents corresponding to a presentation.

21. The computer implemented method of claim 16 wherein said computer system accessing said first enhanced view record is in response to a full text search of a plurality of text files corresponding to a plurality of document images that identified said first enhanced view record.

22. The computer implemented method of claim 16 wherein said computer system accessing said first enhanced view record is in response to a record being identified by a bar-code reader.

23. A computer system comprising:

a display device;

a memory;

a plurality of images being stored by said memory, said plurality of images including a first image;

a plurality of text files being stored by said memory, said plurality of images including a first text file corresponding to optical character recognized text of said first image;

a plurality of positions files being stored by said memory, said plurality of positions files derived from optical character recognized text of said plurality of images, said plurality of positions files including a first positions file;

a plurality of visual enhancement definitions being stored by said memory, said plurality of visual enhancement definitions including a first treatment, said first treatment including a type of image enhancement indicator;

a plurality of regions being stored by said memory, said plurality of regions including a first region, said first region defining a region in said first image corresponding to a portion of said first text file and said first positions file, said first region being defined as a result of optical character recognizing said first image;

a plurality of presentation records being stored by said memory, said plurality of presentation records including a first record, said first record identifying said first image, said first treatment, and said first region;

a processor, said processor being coupled to said memory and to said display, said processor for, in response to accessing said first record, causing said display to display at first treatment.

24. The computer system of claim 23 wherein first region is defined by at least two sets of coordinates on said first image.

25. The computer system of claim 23 wherein said first region is defined by a bottom left coordinate, a top left coordinate, a top right coordinate, and a bottom right coordinate.

26. The computer system of claim 23 wherein said first text file includes a first positions file, said first positions file spatially relating an optical character recognized text in said first text file to a set of coordinates in said first image.

27. A method of displaying information in a computer system, the computer system including a plurality of document images, the method comprising:

searching a plurality of text files using a search term to generate a set of found files, the plurality of text files being derived from the plurality of document images using optical character recognition, the plurality of document images including a first document image, the plurality of text files including a first text file, the set of found files including the first text file, the first text file representing optical character recognized text of the first document image, the first text file including a text string matching the search term;

accessing positions information for relating text in the first text file to corresponding positions in the first document image;

using the positions information to define a first region, the first region defining a region in the first image corresponding to the location of the text string in the first document image;

displaying the first document image including displaying a first enhanced view of the first region, the first enhanced view being enhanced relative to a display of the first document image, said first enhanced view being determined from a previously stored visual enhancement definition.

* * * * *